United States Patent [19]

Birchall et al.

[11] 4,353,748

[45] Oct. 12, 1982

[54] CEMENTITIOUS PRODUCT

[75] Inventors: James D. Birchall, Mouldsworth; Kevin Kendall, Runcorn; Anthony J. Howard, Warrington, all of England

[73] Assignee: Imperial Chemical Industries Limited, London, England

[21] Appl. No.: 159,283

[22] Filed: Jun. 13, 1980

[30] Foreign Application Priority Data

Jun. 26, 1979 [GB] United Kingdom ............... 7922208
May 2, 1980 [GB] United Kingdom ............... 8014847

[51] Int. Cl.$^3$ ............................................. C04B 7/02
[52] U.S. Cl. ................................. 106/89; 106/104; 106/110
[58] Field of Search .................. 106/89, 97, 98, 99, 106/104, 110

[56] References Cited

U.S. PATENT DOCUMENTS

| 4,017,321 | 4/1977 | Reighter | 106/98 |
| 4,070,199 | 1/1978 | Downing et al. | 106/99 |
| 4,157,998 | 6/1979 | Berntsson et al. | 106/97 |
| 4,168,984 | 9/1979 | Ray | 106/104 |
| 4,188,231 | 2/1980 | Valore | 106/98 |
| 4,209,336 | 6/1980 | Previte | 106/97 |

OTHER PUBLICATIONS

Grudemo, "Pore Structure and Properties of Materials", International Symposium, vol. V, D-149, (1974).
Chekovsky et al., "Investigation Into Cement . . . Concrete", International Symposium, vol. V, B-51, (1974).
Higgins & Ralley, Journal of Materials Science, #II, pp. 1995-2003, (1976).

*Primary Examiner*—James Poer
*Attorney, Agent, or Firm*—Cushman, Darby & Cushman

[57] ABSTRACT

A cementitious product produced by setting of a composition comprising a mixture of at least one hydraulic cement and water not more than 2% of the total volume of the product comprising pores of maximum dimension exceeding 100 microns and preferably not more than 2% of the total volume comprising pores exceeding 15 microns in maximum dimension, the product preferably having a flexural strength of at least 40 MPa.

15 Claims, No Drawings

CEMENTITIOUS PRODUCT

This invention relates to a cementitious product produced from a hydraulic cement, and in particular to a cementitious product produced from a composition comprising a hydraulic cement and water.

In making cementitious products from a hydraulic cement composition it is highly desirable to achieve a product of high strength, especially, high flexural strength.

The strengths of cementitious products produced by setting of such cement compositions are generally quite low, and in particular the flexural strengths of such cementitious products are low. Thus, where the cement composition comprises a hydraulic cement of conventional particle size range and an amount of water which is conventionally used in such compositions the flexural strength of the product produced by setting of the composition may be as low as 5 to 10 MPa.

It is known that the flexural strengths of cementitious products may be improved by including a fibrous material in the composition from which the product is produced, as described, for example by D J Hannant in Fibre Cements and Concretes, (Wiley, London 1978). Suitable fibrous materials may be, for example, metal or asbestos.

It has also been proposed in UK Specification Nos. 44369/75, 44836/75, and in the corresponding published Belgian Pat. No. 847763, to improve the properties of cementitious products made from hydraulic cements by incorporating a water-dispersible polymer in a cement-/water composition, while keeping the proportion of water low (up to 28% by weight of the hydraulic cement).

Examples of polymers mentioned for this purpose include cellulose ethers, for example hydroxypropyl methyl cellulose, and polyacrylamides, such polymers being added in proportions up to 25% by weight of the hydraulic cement. Although the use of these compositions does give an improvement in that flexural strengths of the cementitious products in excess of 15 MPa, preferably 20 MPa and more preferably 30 MPa are disclosed, it would still be desirable to be able to produce cementitious products having even greater flexural strengths, for example greater than 35 MPa, and preferably greater than 40 MPa.

Surprisingly, we have now found that it is possible to obtain such cementitious products of high flexural strength. Furthermore, the obtainment of high flexural strengths in the cementitious products does not depend on the use of fibrous reinforcement, although we do not exclude the use of such reinforcement, nor does it depend on the use of very high pressures in the processing of the cement composition.

We have found that in order for high flexural strength to be obtained in a cementitious product produced by setting of a composition comprising a hydraulic cement and water it is necessary to ensure that there should be present in the cementitious product at most only a small proportion of pores having a maximum dimension greater than a defined maximum value.

The present invention provides a cementitious product produced by setting of a composition comprising a mixture of at least one hydraulic cement and water not more than 2% of the total volume of the product comprising pores having a maximum dimension exceeding 100 microns.

By the term "hydraulic cement" we mean any material which sets and hardens by the addition of water, and which thus sets and hardens in the presence of water. The hydraulic cement may be a silicate (siliceous) cement, for example Portland cement. If desired it may be an aluminate (aluminous) cement, for example a calcium aluminate cement, or a calcium sulphate hemihydrate ("Plaster of Paris") cement. Mixtures of two or more different hydraulic cements may be used if desired.

Provided that not more than 2% by volume of the cementitious product comprises pores having a maximum dimension exceeding 100 microns we find that the strengths of the products, and in particular the flexural strengths, are greater than have generally been achieved hitherto, that is than have generally been achieved hitherto without the aid of fibrous reinforcement or the use of very high pressure forming techniques. The cementitious products of the invention generally have flexural strengths in excess of 35 MPa, frequently in excess of 40 MPa, as measured by a three-point flexure test on an Instron machine.

The strength of the cementitious product is greater the smaller is the proportion of relatively large pores, and for this reason it is preferred that not more than 2% of the total volume of the product comprises pores having a maximum dimension exceeding 50 microns. Even more preferred for high strength, especially high flexural strength, is a product in which not more than 2% of the total volume of the product comprises pores having a maximum dimension exceeding 15 microns.

Where not more than 2% of the total volume of the cementitious product comprises pores having a maximum dimension exceeding 15 microns the cementitious products generally have a flexural strength of at least 50 MPa, and may have a flexural strength substantially in excess of 50 MPa.

Although it has been conventional to determine the pore size distribution in a cementitious product by the so-called mercury porosimetry method we find that this method of determination leads to erroneous results, especially where the maximum pore dimension exceeds about 15 microns. It is believed that the reason for the erroneous results is that, although a cementitious product may contain a proportion of relatively large pores having maximum dimensions as hereinbefore described, the pores may effectively have very small entrances which are detected by the mercury porosimetry method rather than the pores associated with the entrances being detected.

The proportion of pores in the cementitious product of the invention having a maximum dimension exceeding 100 microns, or 50 microns or 15 microns, as the case may be, are best determined by the absolute method of quantitative microscopy, and it is this method which is used in the present invention.

Quantitative microscopy is a technique well known in the art. A surface of a sample of the cementitious product is polished, e.g. with a fine abrasive, to produce a plane surface on the sample, the sample is washed to remove the polishing debris from the surface, and the surface is illuminated to ensure that the holes in the surface are contrasted with the plane parts of the surface, and the surface is viewed by means of an optical microscope, or optionally an election microscope, typically at a magnification of ×100, and the holes exceeding 100 microns in size, or 50 microns or 15 microns as the case may be, are determined, as described in "Quantitative Microscopy" by De Hoff and Rhines, McGraw Hill 1968. Sufficient area of the surface of the sample should be viewed to reduce the statistical error, and usually 1000 holes are counted. The sample is then subjected to further polishing in order to expose another surface and the optical or electron microscopic examination is repeated. In general ten such surfaces are examined.

The total volume, including pores, of the cementitious product may be measured, for example, by use of a mercury displacement technique, as described in Fine Particle Measurement by Orr and Dallavalle, MacMillan 1959, or by measurement of the external dimensions of the product. Thus, by use of the techniques of quantitative microscopy and mercury displacement, or measurement of external dimensions, the proportion of pores in the cementitious product exceeding 100 micron in maximum dimension, or 50 microns or 15 microns as the case may be, may be estimated.

It is to be understood that where we refer to a cementitious product having not more than 2% of the total volume of the product comprising pores having a maximum dimension exceeding 100 microns, or 50 microns as the case may be, we are referring to pores which are formed in the cementitious product during processing of the cement composition, and that we are not referring to pores introduced into the product for example, by fabricating the product into the form of a pipe, or by incorporating into the product porous particles, for example so-called "cenospheres", e.g pulverised fuel ash, which may contain a relatively large proportion of pores having a maximum dimension exceeding 100 microns.

In general, the lower is the proportion of the total volume of the cementitious product comprising pores having a maximum dimension exceeding 100 microns, or 50 microns or 15 microns as the case may be, the greater will be the strength of the product. For this reason we prefer that not more than 0.5% of the total volume of the cementitious product comprises pores of maximum dimension exceeding 100 microns, or 50 microns or 15 microns as the case may be. In the high strength cementitious products of the invention the presence of pores of such dimensions may be virtually undetectable.

It is desirable that the cementitious product of the invention should be durable, and in particular should have good resistance to the effects of water and weathering in general. The durability of the cementitious product improves with decrease in the total porosity of the product, and for this reason we prefer that the porosity of the product, that is the total volume of pores in the product expressed as a proportion of the total volume of the product including the pores, does not exceed 20%. Porosities not exceeding 15%, and even porosities not exceeding 10% are more preferred. However, reduction in overall porosity is not essential for the achievement of high flexural strength products. The porosities are determined by use of helium comparison pyknometry, to measure the true volume of the solid phase in a sample of the cementitious product, and by measurement of the total volume of the cementitious product, including pores, as for example by methods hereinbefore described.

The strength of the cementitious product, and in particular the flexural strength, in general improves with decrease of the proportion of pores in the product having a size in the range 2 to 15 microns, and we prefer that the product contains less than 5%, more preferably less than 2%, of the total volume of the product of pores having a size in the range 2 to 15 microns.

Pores in the size range 2 to 15 microns may also be determined by quantitative microscopy, as hereinbefore described.

The aforementioned porosity characteristics may be determined on samples of the cementitious product taken from different places in the mass of the product. The samples may be isolated by cutting with a diamond saw in such a way as not to destroy the pores.

The cementitious product of the invention is produced by setting of a composition comprising a mixture of at least one particulate hydraulic cement and water. The proportion of water should be sufficient to render the mixture plastically deformable and is desirably not be greater than 30% of the weight of the dry particulate hydraulic cement in the mixture, and preferably not greater than 25% by weight. The proportion of water is preferably as low as possible consistent with the composition being plastically deformable as the strength of the cementitious product generally increases with decrease in the proportion of water in the composition from which the product is produced.

In general at least 12% of water will be used. It is most preferred to use not more than 20% of water.

The composition of particulate hydraulic cement and water from which the cementitious product of the invention is produced may contain one or more processing additives to facilitate the mixing of the cement with water, particularly as the composition contains relatively low proportions of water. Such additives may be (a) a polymer having a lubricating action on the cement particles, or (b) an additive having a dispersing action on the particles, for example a surfactant, or a mixture of such additives.

Examples of such additives include (i) cellulose ethers, for example hydroxypropyl methyl cellulose, (ii) amide-substituted polymers, for example a polymer or copolymer of acrylamide, (iii) polyalkylene oxide derivatives which may be for example a polyalkylene oxide (alternatively described as a polyalkylene glycol) for example polyalkylene glycols of molecular weight above about 10,000, or polyalkoxy derivatives of alcohols, phenols or the like, and (iv) sulphonated materials of the kind known in the art for imparting plasticising properties, for example lignosulphonates and sulphonated napthalene salts.

Mixtures of two or more such additives may be used if desired.

The additives may be used for example, in a proportion of 0.5% to 10% by weight of the hydraulic cement in the composition.

The hydraulic cement composition may contain, in addition to the cement, water and optional processing additive, other materials known in the art, for example fillers and/or aggregates conventional in the art, dispersing aids, setting modifiers, e.g gypsum, and materials which increase fracture toughness, for example fibrous and/or rubbery materials.

Useful fillers/aggregates include various forms of silica, for example sand, quartz sand, and fine amorphous silica, e.g fumed silica, olivine, titania, for example pigment grades of titania, slate powder, and mixtures thereof.

The cement composition may be made by mixing water with the hydraulic cement or with a mixture of the hydraulic cement and any other materials required to be present. Where the composition is to contain a processing additive the additive is preferably used in the form of an aqueous solution or dispersion of the additive. For example, an aqueous solution or dispersion of the processing additive may be mixed with the hydraulic cement or with a mixture of the hydraulic cement and water.

It is desirable, in order to provide a control of the porosity characteristics of the cementitious product and thus a control of the flexural strength of the cementitious product, and in particular in order to produce a product having not more than 2% of the total volume of pores of maximum dimension exceeding 100 microns, for the cement composition to be thoroughly mixed, for example, by mixing under conditions of high shear. For example, the composition may be mixed on a Banbury mixer or in a screw extruder. However, the composition is most preferably mixed under conditions of high shear on a twin-roll mill by passing the composition repeatedly through the nip between the rolls of the mill, this procedure producing a thoroughly well mixed composition.

The porosity characteristics of the cementitious product, and thus the flexural strength of the product, may also be influenced by the choice of the particle size distribution of the hydraulic cement from which the product is produced, and to assist in the production of a cementitious product having not more than 2% of the total volume of pores exceeding 100 microns in maximum dimension a hydraulic cement having a multi-modal distribution of particle sizes may be used.

Conventional particulate hydraulic cements are usually obtained by comminution of initial coarse material to fine powders which powders may have very variable particulate size distributions. Even so, all commercially available hydraulic cements have in common the fact that the particle size distribution extends over a wide and substantially continuous band of particle sizes, for example from submicron to about 150 microns. Different cements vary from one to another in the distribution of sizes and in the extent of the size distribution but they have in common this substantially continuous type of distribution. It is to be understood that such hydraulic cements of conventional particle size distribution may be used in the production of the cementitious products of the invention, particularly where the cement composition is mixed under conditions of high shear. However, hydraulic cements having a multi-modal distribution of particle sizes may be used with advantage.

By term "multi-modal" there is meant a pattern of size distribution in which there are two or more distinct bands or modes of particle sizes present, the intermediate particle sizes between adjacent main bands or modes being present only in a substantially reduced proportion, so that the overall size distribution is no longer substantially continuous.

These intermediate particle sizes need not be eliminated completely, and it is sufficient that the total weight of the particles of intermediate size should not exceed about 20% of the total weight of those particles in the adjacent main bands or modes.

The multi-modal distribution is preferably bi-modal, but may with advantage be tri-modal.

The number of modes may be even greater, for example four, though the advantage in doing this may not be economically sufficient to justify the additional cost and effort involved.

In quantitative terms some examples of the desired particle size distributions of the hydraulic cement are as follows for bi-modal distribution.

As a first general guide it is preferred that the ratio of the weight average mean particle sizes of particles in their respective bands or modes should be as widely separated as practicable, since this assists in achieving desired properties in the cementitious products made from the hydraulic cement. Thus, if the weight average mean particle size of the coarser mode or band is defined as D1 and the weight average mean particle size of the finer mode or band is defined as D2, the ratio D1:D2 is preferably at least 2, more preferably at least 10, and even more preferably in the range 20 to 40.

As a second guide it is found to be desirable to have the range of particles sizes in each mode or band narrow rather than wide. It is therefore preferred that these ranges for the bands be as narrow as is technically and economically practicable. A particularly useful range of compositions, of bi-modal distribution, may be specified as those comprising hydraulic cement particles of the following sizes, (a) at least 50% and preferably 70% to 90% by weight of particles of particle size in the range 60 to 110 microns, (b) at least 5% and preferably 10% to 30% by weight of particles of particle size in the range 1 to 10 microns, and (c) not greater than 20%, preferably no greater than 10%, and still more preferably no greater than 5%, by weight of particles of particle size outside the two ranges (a) and (b) above.

Improvements can be obtained by using a narrower band of particle sizes in the fractions (a) and (b) above, for example a range extending over about 20 to 25 microns in fraction (a), for example from 70 to 90 microns, and/or a range extending over about 5 microns in fraction (b), for example from 4 to 8 microns.

By applying the first and second general guides, it is practicable to define useful compositions outside those specifically comprising fractions (a), (b) and (c) as hereinbefore defined. Even so, it is believed that the optimum composition will depend to some extent upon the particular hydraulic cement or cements employed, the economics and practicability of achieving the desired size gradation and separations, and how closely the user desires to approach the maximum strength for the set cementitious product.

For tri-modal distributions, very similar guidelines apply. If the weight average mean particle sizes of the three modes, coarse, intermediate, and fine respectively, are D1, D2, and D3 then it is preferred that the ratios by weight D1:D2 and D2:D3 should each satisfy the ratio requirements specified above for D1:D2 in a bi-modal distribution. Of course, it may not be practicable for both D1:D2 and D2:D3 to be the same, and so they may each differ considerably from one another but still be within one or other of the preferences. The preference for fractions having narrow bands of size in a bi-modal distribution is likewise preferred in the case of a tri-modal distribution.

A particular useful range of compositions of trimodal distribution may be specified as those comprising particles of the following sizes:
(a) at least 50%, and preferably 70% to 90% by weight, of particles of particle size in the range 100 to 150 microns,
(b) at least 5%, and preferably 10% to 30% by weight, of particles of particles size in the range 7 to 12 microns and
(c) at least 1%, and preferably 3% to 8% by weight, of particles of particle size in the range 0.5 to 2 microns.

The multi-modal distribution of particulate hydraulic cement may be achieved by modifying the process of comminution of the raw cement particles and using appropriate classifying, separating or mixing procedures. For example, the finely powdered cement normally produced may be classified, whether by sieving or any other convenient means, into portions of selected size range distributions, and then these fractions, or part of them, may be mixed in selected proportions with each other and/or with some of the original unclassified material so as to achieve the multi-modal distribution in the final mixture.

The use of a multi-modal distribution of particulate hydraulic cement surprisingly enables a particularly low proportion of water to be used in the cementitious composition from which the cementitious product of the invention is produced, and proportions of water of as low as 7% by weight of the dry particulate hydraulic cement may be used.

The production of a cementitious product having not more than 2% of the total volume of pores exceeding 100 microns in maximum dimension may be assisted by using a small particle size hydraulic cement and a low proportion of water in the hydraulic cement composition from which the cementitious product is produced. Thus, the cementitious product may advantageously be produced from a hydraulic cement and water in which the weight average mean particle size of the particles of the cement is less than 20 microns and in which the proportion of water is not greater than 30% by weight of the hydraulic cement in the composition.

A weight average mean particle size of the hydraulic cement in the range 2 to 15 microns is preferred and it is also preferred that the hydraulic cement is substantially free of particles having a size above 30 microns, and is more preferably substantially free of particles having a size above 20 microns as cementitious products produced from such compositions have even greater flexural strengths.

Hydraulic cement of the desired weight average mean particle size may be produced, for example, by conventional particle size classification techniques, e.g by air classification or by sieving a commercially available cement. In order to produce a greater proportion of hydraulic cement having the desired particle size commercially available cement may be classified or it may first be ground and then classified. Cement having a particle size larger than that desired and which has been separated by classification may be ground and then re-classified.

The weight average particle size of the hydraulic cement may be determined by conventional techniques, for example, by air elutriation.

The hydraulic cement composition may be shaped or otherwise formed easily and conveniently by use of relatively low pressures without resorting to the use of high pressure forming techniques, although we do not exclude the use of high pressures. If desired the compositions may be shaped, for example, by extrusion or by shaping in a press, e.g in a hydraulic press.

It may be of advantage, and indeed it is preferred in order to assist the control of the porosity characteristics of the cementitious product, to effect the setting of the composition under an applied pressure and to release the pressure not before the setting has proceeded at least to the extent that the composition does not relax on release of the pressure, that is, does not change substantially in dimensions on release of the pressure. The applied pressure need only be relatively low, for example up to 5 MPa. The time for which the pressure is desirably applied will depend on the nature of the hydraulic cement and on the rate of setting of the composition, and may be determined by simple experiment.

Where the mixture of hydraulic cement powder and water is shaped or otherwise formed by application of such relatively low pressures the cementitious product produced therefrom has a uniform pore size distribution throughout the product.

The setting of the hydraulic cement composition may be effected at ambient temperature although setting may be accelerated by use of elevated temperatures.

The setting is also desirably effected in a humid atmosphere, e.g in an atmosphere of substantially 100% relative humidity.

Thus the setting of the hydraulic cement composition may be achieved in conventional manner, for example by maintenance in a humid atmosphere, preferably of relative humidity at or near 100%, for a period of 0.5 to 28 days. An alternative method is to maintain the composition at elevated temperature and pressure and high humidity to accelerate setting and curing of the composition.

The invention is illustrated by the following examples in which all parts are expressed as parts by weight.

EXAMPLE 1

100 parts of ordinary Portland Cement, 3 parts of hydroxypropyl methyl cellulose (Celacol HPM 15,000 DS), and 15 parts of water were mixed in a planetary mixer into the form of a crumble. The crumble was then charged to a twin-roll mill and formed into a sheet on the mill, the sheet being passed repeatedly through the nip between the rolls of the mill in order to thoroughly mix the composition. The sheet was then removed from the mill, placed between two polyethylene terephthalate sheets, pressed at an applied pressure of 3 MPa, allowed to stand for 7 days in an atmosphere of 100% relative humidity at a temperature of 20° C., and finally the sheet was allowed to dry for 7 days.

The cement sheet was scored to outline strips of dimensions 5.0 cm × 1.7 × 0.3 cm, the strips were separated by breaking on the scored lines, and the strips were then subjected to a 3-point bend test on an Instron machine using a span of 3.2 cm, a depth of 0.3 cm, a width of 1.7 cm, and a crosshead speed of 0.05 cm/min, and the load to failure of the strips was measured.

The flexural strengths of the strips were calculated using the following formula:

$$\sigma = \frac{1.5\ WL}{d^2 w} \times \frac{0.101325}{1.0332}\ \text{MPa}$$

where

W = load at failure in Kg
L = span in cm
d = depth in cm
w = width in cm
σ = flexural strength The flexural strength of the strips (average of 6 values) was 35±2 MPa.

Analysis of the sheet by quantitative microscopy indicated that the sheet comprised 6.5% by volume of pores of maximum dimension greater than 15 microns, 1.1% by volume of pores of maximum dimension greater than 50 microns, and 0.1% by volume of pores of maximum dimension greater than 100 microns.

By way of comparison 100 parts of ordinary Portland Cement, 2 parts of hydroxypropyl methyl cellulose, and 18 parts of water were mixed in a Brabender plastograph, the resultant mixture was cast into a mould by trowelling, the mould and contents were allowed to stand at 100% relative humidity for 7 days at a temperature of 20° C., and the mould and contents were finally allowed to dry by standing under ambient conditions for 7 days.

The flexural strength of the sheet was measured following the procedure described above. The sheet had a flexural strength of 17±3 MPa (average of 6 values).

Analysis of the sheet by quantitative microscopy indicated that the sheet comprised 8.2% by volume of pores of maximum dimension greater than 15 microns, 4.8% by volume of pores of maximum dimension greater than 50 microns, and 2.3% by volume of pores of maximum dimension greater than 100 microns.

EXAMPLE 2

The procedure of Example 1 was followed except that a mixture of 100 parts of ordinary Portland cement, 5 parts of hydroxypropyl methyl cellulose, and 15 parts of water were used, and the sheet was pressed at an applied pressure of 5 MPa.

The flexural strength of the sheet was 45±2.5 MPa. Analysis of the sheet by quantitative microscopy indicated that the sheet comprised 3.2% by volume of pores of maximum dimension greater than 15 microns, 0.5% by volume of pores of maximum dimension greater than 50 microns, and pores of maximum dimension greater than 100 microns were virtually undetectable.

EXAMPLE 3

Ordinary Portland Cement powder was separated into fractions of different particle size, and two fractions were selected as follows:
  Fraction 1: Comprising material which passed through a sieve of 125 microns hole size but did not pass through a sieve of 76 microns hole size.
  Fraction 2: Comprising material of particle size below 10 microns, using an "Alpine" 100 MZR particle classifier. (This material was found to be substantially all of particle size in the range 1 micron to 10 microns, with a peak at 5 microns).

A dry mixture was made by mixing 80 parts of Fraction 1 with 20 parts of Fraction 2, by vigorous stirring to obtain intimate mixing. This mixture was then added at a steady rate to 13.3 parts of an aqueous polyacrylamide gel (20% by weight of polyacrylamide "Cyanamer P.250", supplied by British Celanese, dissolved in water) on a twin-roll mill. After thorough mixing on the mill, the components formed a stiff dough, which was pressed into plate form between two polyethylene terephthalate sheets at a pressure of 5 MPa.

The "plate" of dough was then allowed to stand in a fog-box (at ambient temperature and 90 to 100% relative humidity) for 7 days and then under ambient conditions for a further 7 days.

The product was found to have a flexural strength (on the 3 point bend test) of 61±4 MPa.

The porosity of the product as measured by true and apparent volume determinations was 22% and the proportion of pores greater than 15 microns in size, as measured by the quantitative microscopy method, was 0.5% of the total volume of the product.

EXAMPLE 4

A sample of ordinary Portland cement was classified using an Alpine classifier into two fractions one consisting of particles having a size above 10 microns and one consisting of particles having a size less than 10 microns. The latter fraction was analysed and was found to have a weight average mean particle size of 5 microns.

A dough was prepared by mixing on a twin-roll mill 40 parts of the cement having a weight average mean particle size of 5 microns and 10 parts of an aqueous gel containing 9.3 parts of water and 0.7 parts of hydroxypropyl methyl cellulose (Celacol HPM 15,000). After thorough mixing on the mill the dough was sandwiched between sheets of polyethylene terephthalate and pressed into a sheet of thickness 3 mm on a hydraulic press at a pressure of 3 MPa. The sheet was allowed to stand for 7 days in a fog-box operating at 100% relative humidity and a temperature of 18°±2° C., and thereafter the sheet was allowed to stand for 7 days under ambient conditions.

The flexural strength of the cementitious product was 60 MPa (average of 6 values), the product had a porosity of 22%, and pores having a maximum dimension exceeding 15 microns were virtually undetectable.

EXAMPLE 5

The procedure of Example 3 was repeated except that there was used 80 parts of ordinary Portland cement of size in the range 100 to 120 microns, 20 parts of ordinary Portland cement of size below 10 microns with a peak at 5 microns, and 15 parts of aqueous polyacrylamide gel, and the cement dough pressed into plate form between sheets of polyethylene terephthalate at a pressure of 5 MPa and the sheet was allowed to stand in a water bath at 30° C. for 7 days and thereafter was allowed to dry under ambient conditions for 7 days.

The cementitious product was found to have a flexural strength of 60±6 MPa (mean of 5 values) and a proportion of pores of maximum dimension greater than 15 microns of 0.8%.

EXAMPLE 6

The procedure of Example 1 was followed except that 100 parts of ordinary Portland cement (supplied by Blue Circle), 5 parts of hydroxypropyl methyl cellulose, and 15 parts of water were used, and the cement sheet formed from the composition was subjected to the procedure of Example 5.

The cementitious product was found to have a flexural strength of 58.8±2.3 MPa (mean of 5 values) and a proportion of pores of maximum dimension greater than 15 microns of 0.1%.

EXAMPLE 7

The procedure of Example 6 was repeated except that 3 parts of hydroxypropyl methyl cellulose were used.

The cementitious product had a flexural strength of 41±1.1 MPa and a proportion of pores of maximum dimension greater than 15 microns of 2.8%.

EXAMPLE 8

The procedure of Example 1 was followed except that 100 parts of calcium aluminate cement was used in place of the ordinary Portland cement, 5 parts of hydroxypropyl methyl cellulose, and 15 parts of water were used, and the cement sheet formed from the composition was subjected to the procedure of Example 5.

The cementitious product had a flexural strength of 54.6 MPa and a proportion of pores of maximum dimension exceeding 15 microns of 0.7%.

What we claim is:

1. A cementitious product produced by setting of a composition comprising a mixture of at least one hydraulic cement and water not more than 2% of the total volume of the product comprising pores of maximum dimension exceeding 100 microns.

2. A cementitious product as claimed in claim 1 in which not more than 2% of the total volume of the product comprises pores having a maximum dimension exceeding 50 microns.

3. A cementitious product as claimed in claim 1 in which not more than 2% of the total volume of the product comprises pores having a maximum dimension exceeding 15 microns.

4. A cementitious product produced by setting of a composition comprising a mixture of at least one hydraulic cement and water wherein not more than 2% of the total volume of the product comprises pores having a maximum dimension exceeding 15 microns, the cementitious product having a flexural strength of at least 40 MPa.

5. A cementitious product as claimed in claim 1 or 4 in which not more than 0.5% of the total volume of the product comprises pores of maximum dimension exceeding 100 microns.

6. A cementitious product as claimed in claim 5 in which not more than 0.5% of the total volume of the product comprises pores having a maximum dimension exceeding 50 microns.

7. A cementitious product as claimed in claim 6 in which not more than 0.5% of the total volume of the product comprises pores having a maximum dimension exceeding 15 microns.

8. A cementitious product as claimed in claim 1 in which the total volume of pores in the product expressed as a proportion of the total volume of the product, including pores, does not exceed 20%.

9. A cementitious product as claimed in claim 8 in which the total volume of pores in the product expressed as a proportion of the total volume of the product, including pores, does not exceed 10%.

10. A cementitious product as claimed in claim 1 in which not more than 5% of the total volume of the product comprises pores having dimensions in the range 2 to 15 microns.

11. A cementitious product as claimed in claim 1 in which the hydraulic cement is a silicate cement.

12. A cementitious product as claimed in claim 1 in which the hydraulic cement is an aluminate cement.

13. A cementitious product as claimed in claim 1 in which the hydraulic cement is a calcium sulphate hemihydrate cement.

14. A cementitious product as claimed in claim 1 having a flexural strength of at least 40 MPa.

15. A cementitious product as claimed in claim 14 having a flexural strength of at least 50 MPa.

* * * * *